(12) United States Patent
Guan et al.

(10) Patent No.: US 8,053,945 B2
(45) Date of Patent: Nov. 8, 2011

(54) ELECTRIC MOTOR COMMUTATOR

(75) Inventors: Xin Hui Guan, Shenzhen (CN); Rui Feng Qin, Hong Kong (CN); Hai Bo Ma, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/258,015

(22) Filed: Oct. 24, 2008

(65) Prior Publication Data

US 2009/0108698 A1    Apr. 30, 2009

(30) Foreign Application Priority Data

Oct. 26, 2007    (CN) .......................... 2007 1 0169135

(51) Int. Cl.
*H01R 39/32* (2006.01)
(52) U.S. Cl. ....................................... 310/234
(58) Field of Classification Search .......... 310/234, 310/236, 237
See application file for complete search history.

(56) References Cited

U.S. PATENT DOCUMENTS

| | | | | |
|---|---|---|---|---|
| 2,658,158 A | * | 11/1953 | Bender, Jr. et al. | 310/234 |
| 3,646,374 A | * | 2/1972 | Jordan et al. | 310/45 |
| 3,707,638 A | * | 12/1972 | Nailen | 310/152 |
| 3,760,493 A | * | 9/1973 | Snively | 29/596 |
| 4,326,140 A | * | 4/1982 | Rohloff | 310/234 |
| 4,521,710 A | * | 6/1985 | Mabuchi | 310/234 |
| 4,835,430 A | | 5/1989 | Siu | |
| 5,157,293 A | * | 10/1992 | Escaravage | 310/71 |
| 5,547,122 A | | 8/1996 | Smeggil et al. | |
| 6,499,209 B1 | * | 12/2002 | Landin et al. | 29/596 |
| 6,774,526 B2 | * | 8/2004 | Furuya et al. | 310/233 |
| 6,927,507 B2 | * | 8/2005 | Hashimoto et al. | 310/45 |
| 6,949,859 B2 | * | 9/2005 | Nakayama et al. | 310/234 |
| 2002/0185930 A1 | | 12/2002 | Furuya | |
| 2003/0057798 A1 | | 3/2003 | Nakayama et al. | |
| 2004/0100160 A1 | | 5/2004 | Potocnik | |

FOREIGN PATENT DOCUMENTS

| | | |
|---|---|---|
| FR | 2169264 | 9/1973 |
| GB | 1428054 | 3/1976 |
| GB | 2005927 A | 4/1979 |
| JP | 2007267456 | 10/2007 |

* cited by examiner

*Primary Examiner* — Tran Nguyen
(74) *Attorney, Agent, or Firm* — Muncy, Geissler, Olds & Lowe, PLLC

(57) ABSTRACT

A commutator 10 for an electric motor comprises a plurality of commutator segments supported by a base. The segments have an electrically conductive body portion 14 and at least one electrically conductive foldable tang 16 provided on the body portion 14 for engaging a winding lead wire 44 of an electric motor. The foldable tang 16 has a proximal end 18 on or adjacent to the body portion 14, and a distal end 22 remote from the proximal end 18. A wire-accommodating portion 30 is provided on or adjacent to the foldable tang 16, so that, when the tang 16 is folded, the wire-accommodating portion provides a predetermined gap 56 for the winding lead wire 44.

14 Claims, 3 Drawing Sheets

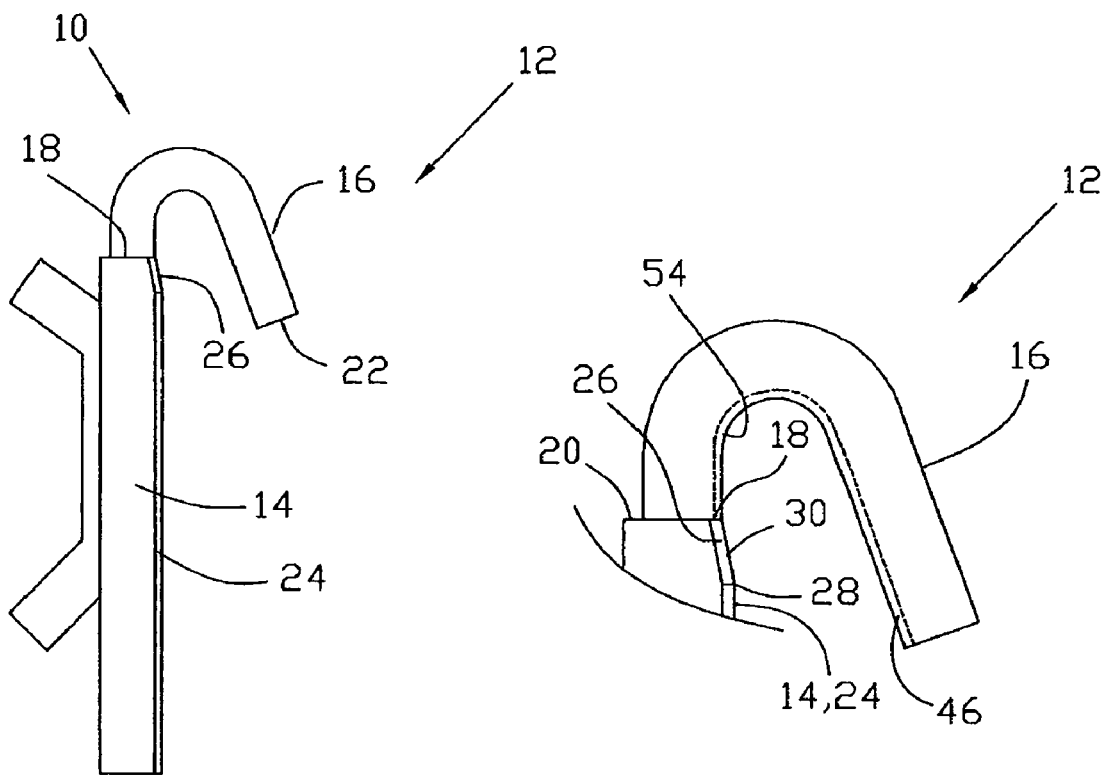
FIG. 1
FIG. 2
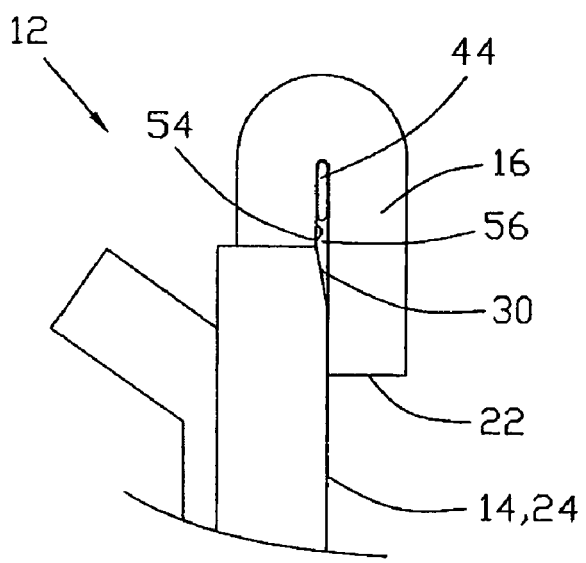
FIG. 3

ELECTRIC MOTOR COMMUTATOR

CROSS REFERENCE TO RELATED APPLICATIONS

This non-provisional patent application claims priority under 35 U.S.C. §119(a) from Patent Application No. 200710169135.0 filed in The Peoples Republic of China on 26 Oct. 2007.

FIELD OF THE INVENTION

This invention relates to a commutator for an electric motor.

BACKGROUND OF THE INVENTION

Commutators are rotating electrical connectors which are widely used on electric motors such as universal motors and brush type permanent magnet direct current (PMDC) motors to transfer electrical power between the stationary stator of the motor and the rotating rotor.

Cylindrical and planar are types of commutators. A cylindrical (or round) commutator is made of insulated axially-oriented conductive segments. A planar (or flat) commutator is made of insulated radially-oriented conductive segments. Electrical contacts, typically in the form of brushes, rub or slide on the rotating commutator segments to make the electrical connection. The segments are connected to the windings wound on the rotor core of the motor, and thus act as a rotary switch in order to reverse the electrical current. In a DC electric motor, the switching causes the generated magnetic field to reverse, thus allowing the motor to keep turning.

The wire of the windings on the rotor core is traditionally copper, since copper is a good electrical conductor and is reasonably robust. However, due to increasing cost, alternatives are being researched.

One such alternative is aluminium. Aluminium is a cheap alternative to copper, but is reasonably fragile. The wire can be wholly formed from aluminium, or can be an aluminium core with a copper coating, for example a copper clad aluminium (CCA) wire. When connecting a lead wire of an aluminium winding to the tang of a commutator segment, it is more common that the aluminium wire is damaged and severed as the tang is crimped or folded onto the wire and fused. This leads to a far higher scrap rate during production of the motor, which is not cost-effective.

An attempt to reduce the scrap rate uses a commutator which has tangs with a predetermined minimum spacing when folded, designed to prevent crushing and severing of the aluminium wire. This works relatively well in preventing the severing of the wire but for CCA wire, the copper cladding often tears or cracks leading to exposure of the aluminium core resulting in corrosion and eventual failure. The copper/aluminium interface between an aluminium wire connected to a copper tang is also subject to a high level of corrosion.

The present invention seeks to provide a solution to this problem.

SUMMARY OF THE INVENTION

According to a first aspect of the invention, there is provided a commutator for an electric motor, comprising a plurality of commutator segments supported by an electrically non-conductive base, the commutator segments comprising: an electrically conductive body portion and at least one tang provided on the body portion for engaging a winding lead wire of the electric motor, the tang being electrically conductive and foldable and having a proximal end on or adjacent to the body portion, and a distal end remote from the proximal end; and a preformed wire-accommodating portion on or adjacent to the tang, so that, when the tang is folded, the wire-accommodating portion provides a predetermined interior gap for the winding lead wire, characterised by a layer of an electrically conductive ductile material formed on a surface of the tang which contacts the winding lead wire.

Preferably, the electrically conductive ductile material is tin.

Preferably, the electrically conductive ductile material is solder.

Preferably, the solder is arranged to flow over and cover a contact portion of the winding lead wire during attachment.

Preferably, the wire-accommodating portion is one of a step and a ramp.

Preferably, the said step or ramp is provided on at least one of the tang spaced from the body portion and on the body portion.

Preferably, the tang is hooked shaped.

Preferably, when the tang is folded and contacting the brush-contacting surface, an interior surface of the foldable tang is spaced from the brush-contacting surface and defines the predetermined internal gap.

Preferably, the tang includes a longitudinal interior edge which extends from the proximal end to the distal end, the longitudinal interior edge including a chamfer or rounded portion.

According to a second aspect of the invention, there is provided an electric motor comprising a stator, a rotor having a shaft and a rotor core mounted on the shaft, electrically conductive windings wound on the rotor core, a commutator as claimed in any one of the preceding claims, and brush gear in contact with the body portion, with the foldable tang in a folded condition, at least one of the lead wires or the winding passing through the predetermined gap formed by the wire-accommodating portion.

Preferably, the winding lead wires are or include aluminium.

Preferably, the ductile material, especially if solder, coats a portion of the winding lead wire and fills the predetermined internal gap.

BRIEF DESCRIPTION OF THE DRAWINGS

Preferred embodiments of the invention will now be described, by way of example only, with reference to the accompanying drawings, in which:

FIG. 1 shows a side view of a first embodiment of a commutator segment, in accordance with the first aspect of the invention;

FIG. 2 is an enlarged portion of commutator segment shown in FIG. 1, showing an end of a body portion and a foldable tang;

FIG. 3 shows the foldable tang in a folded condition;

DETAILED DESCRIPTION OF THE PREFERRED EMBODIMENTS

Figure 4:
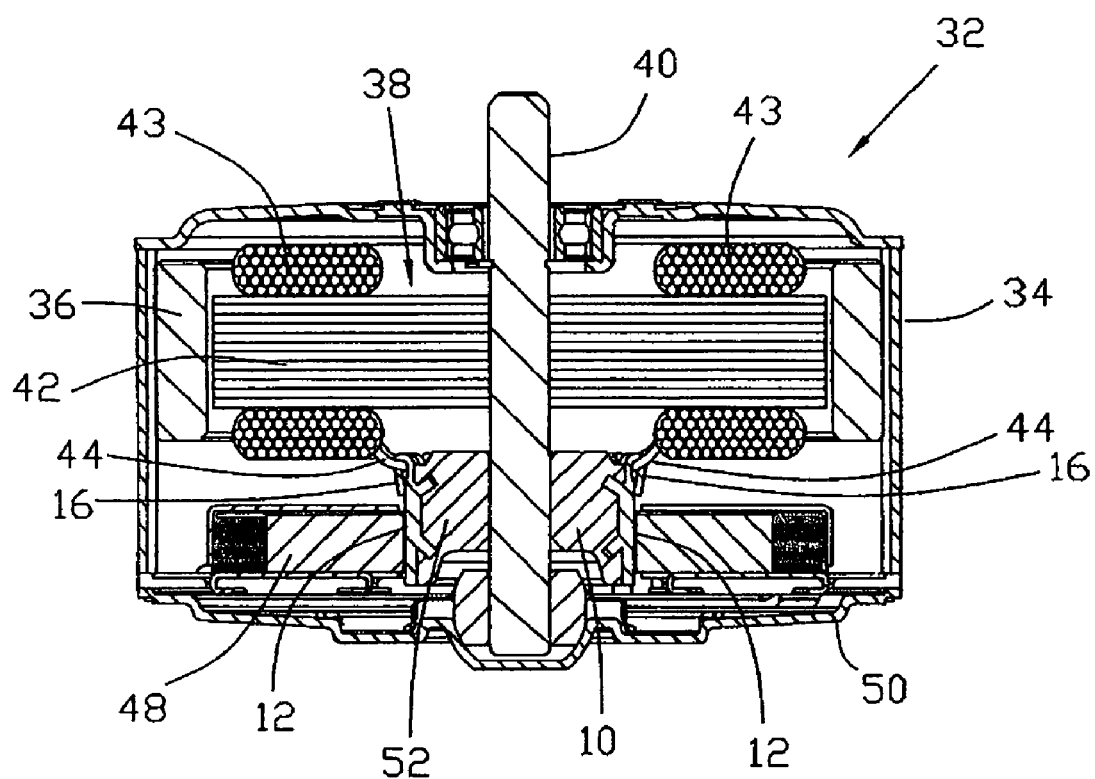
FIG. 4 shows a cross-section of an electric motor having a commutator with a plurality of the commutator segments.

Referring firstly to FIG. 1 to 3 of the drawings, there is shown part of a commutator 10 in the form of a commutator segment 12. The segment 12 comprises an elongate body portion 14 and a foldable hook-shaped tang 16 provided at one end of the body portion 14. The body portion 14 and tang 16 are typically formed from an electrically conductive and malleable material, such as copper.

The foldable tang 16 includes a proximal end 18 which is formed on one axial end 20 of the body portion 14, and a free distal end 22 which is remote from the proximal end 18.

The proximal end 18 of the foldable tang 16 is formed on the said axial end 20 of the body portion 14 so as to be offset from the brush-contacting surface 24 of the body portion 14 in a radially inwards direction of the commutator 10. A chamfer 26 is formed on the edge 28 of the body portion 14 adjacent to the proximal end 18 of the foldable tang 16 and bounding the brush-contacting surface 24. The chamfer 26 thus provides a step or ramp 30 to the foldable tang 16 from the brush-contacting surface 24 of the body portion 14.

Referring to FIG. 4, a DC electric motor 32, having a commutator 10 in which the commutator segment 12 described above is used, includes a housing 34, permanent magnets forming a stator 36 provided within the housing 34, and a rotor 38 having a shaft 40 rotatably supported by the housing 34 and a rotor core 42 mounted on the shaft 40. The segmented commutator 10 is provided on the shaft 40 for rotation therewith. Electrically conductive wire, formed of or including aluminium, such as copper clad wire having an aluminium core, is wound about poles of the rotor core 42 to form rotor windings 43. Lead wires 44 for the windings are connected to the tangs 16 of the commutator 10. Brush gear 48, typically mounted on an end cap 50 which closes the housing 34, makes sliding electrical contact with the commutator 10 for transferring electrical power.

The segmented commutator 10 includes a plurality of the commutator segments 12 described above, oriented axially and arranged circumferentially in parallel with each other on a base of electrically insulating material 52. The segments 12 are arranged such that the foldable tangs 16 are closest to the rotor core 42.

Although a round or cylindrical type commutator is described above, the commutator segment can be part of a flat or planar type commutator.

During manufacture, a winding lead wire 44 is passed around each foldable tang 16, and the tang 16 is then folded so that the distal end portion 22 contacts the brush-contacting surface 24 of the body portion 14, as shown in FIG. 3. The foldable tangs 16 are coated with an electrically conductive ductile material 46, such as tin and preferably tin in the form of a layer of solder, typically applied by a plating process, to aid electrical and mechanical connection between the lead wire 44 and the tang 16. As such the ductile material 46, e.g. solder, need only be applied to the inner surface of the tang 16 which contacts the lead wire 44 in use. A fusing process is finally used to form a solid connection between the tang 16 and the winding lead wire 44 and to prevent the tang 16 from re-opening. The solder fills any small voids between the winding lead wire 44 and the tang 16, thereby increasing the strength of the connection and reducing the electrical resistance of the joint. The fusing process uses electricity to heat the tang 16, to burn off the insulating coating on the winding lead wire 44 where it contacts the tang 16, and to soften the wire to make intimate contact with the tang 16. The heat also melts the solder 46 which covers a portion of the lead wire 44 which is in contact with the tang 16. Thus the ductile material, e.g. solder, provides a protective layer between the copper of the tang 16 and the aluminium of the lead wire 44. This reduces galvanic corrosion. Where the lead wire is a CCA wire, the material covers or fills any cracks or tears in the copper layer protecting the aluminium core of the wire.

The fusing process thus deforms the winding lead wire 44, which effectively becomes trapped and clamped to the commutator segment 12 by an interior surface 54 of the folded tang 16. However, because of the step or ramp 30, formed by the offset of the interior surface 54 of the tang 16 relative to the brush-contacting surface 24, a predetermined interior gap 56 remains when the tang 16 is in the folded condition. The gap 56 is of sufficient dimension to allow the lead wire 44 to be deformed and securely clamped in place without severe damage or severing. Where the ductile material is solder, during the fusing or attachment process, the solder will soften and flow to cover the wire as described above and to fill the void or space between the wire 44 and the tang 16 within the predetermined interior gap 56 for accommodating the lead wire.

Figure 5:
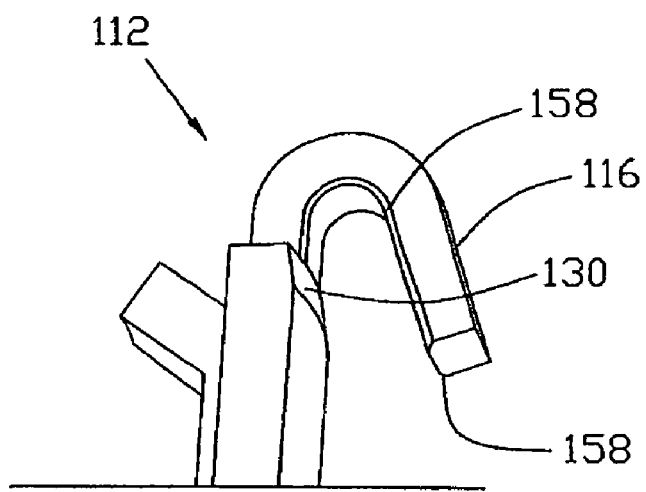
FIG. 5 shows a second embodiment of a commutator segment, in accordance with the first aspect of the invention.

Referring to FIG. 5, a modification to the tang of the commutator segment is shown. In this second embodiment, foldable tang 116 of commutator segment 112 has one or both interior edges 158 which are chamfered or rounded along their longitudinal extents, in addition to step or ramp 130. This has the advantage of removing any sharp edge which may cut into the soft material of the winding lead wire 44 during the folding and fusing process.

In all other respects, the commutator segment 112 is as described with reference to the first embodiment.

It will be realised that the tang 116 could also or alternatively have one or more exterior longitudinal edges, opposite the interior edge or edges 158, which are chamfered or rounded. This would be advantageous in preventing breakage through rubbing or abrasion either during winding or during use of the motor.

Figure 6:
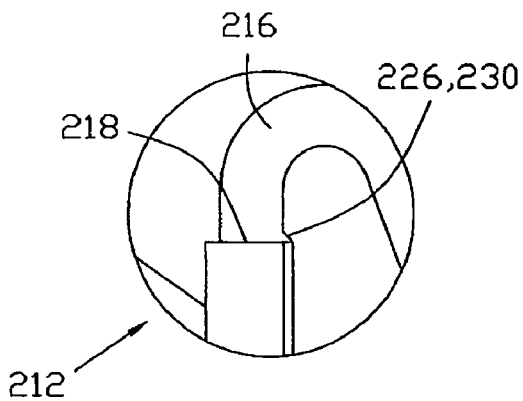
FIGS. 6 to 11 show third to eighth embodiments of a commutator segment, in accordance with the first aspect of the invention.

Although the first embodiment is described with the chamfer 26 being provided on an edge of the body portion 14, as shown in FIG. 6, a third embodiment of the commutator segment 212 can be provided with a step or ramp 230, for example a chamfer 226, at the proximal end 218 of the tang 216. This has the effect of forming a recess within the tang itself, to accommodate the lead wire.

Figure 7:
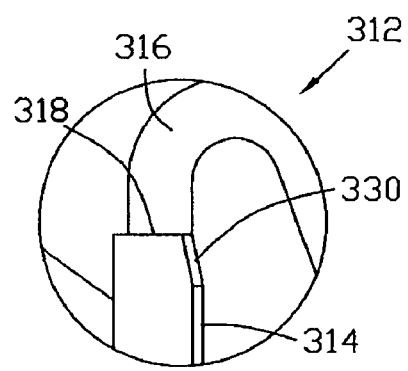

Rather than a chamfer 26, 226, a more pronounced ramp 330 or fillet can be provided from the proximal end 318 of the tang 316 and partway along the body portion 314. This fourth embodiment of a commutator segment 312 is shown in FIG. 7.

Figure 8:
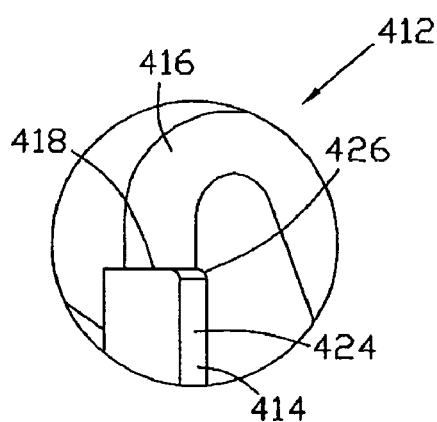

Similar to chamfer 26 which is straight in the longitudinal direction of the segment, a rounded edge 426 which is arcuate in the longitudinal direction of the segment 412 can be formed across the lateral extent on the axial face of the body portion 414 adjacent to the proximal end 418 of the tang 416. The proximal end 418 of the tang 416, however, remains offset from the brush-contacting surface 424 of the body portion 414. This fifth embodiment of the commutator segment 412 is shown in FIG. 8.

The rounded edge 426 can also be arcuate in the lateral direction of the segment 412.

Figure 9:
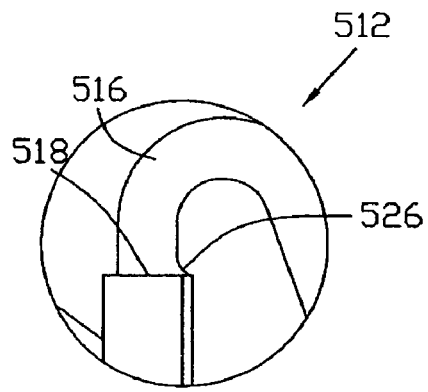

Instead of chamfer 226 being formed on the proximal end 218 of the foldable tang 216, as described above, the proximal end 518 of the tang 516 can include a rounded edge 526, similar to the arrangement of the fifth embodiment. Again, this effectively provides a recess adjacent to the proximal end 518 of the tang 516 in order to at least partially accommodate the winding lead wire. This sixth embodiment of a commutator segment 512 is shown in FIG. 9.

Figure 10:
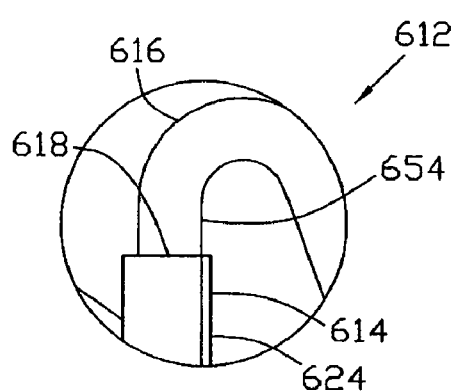

FIG. 10 shows a seventh embodiment of a segment 612 of a commutator 610. Again, this embodiment is similar to those above, except the offset between the brush-contacting surface 624 of the body portion 614 and the interior surface 654 at the proximal end 618 of the foldable tang 616 is a clearly defined step.

Figure 11:
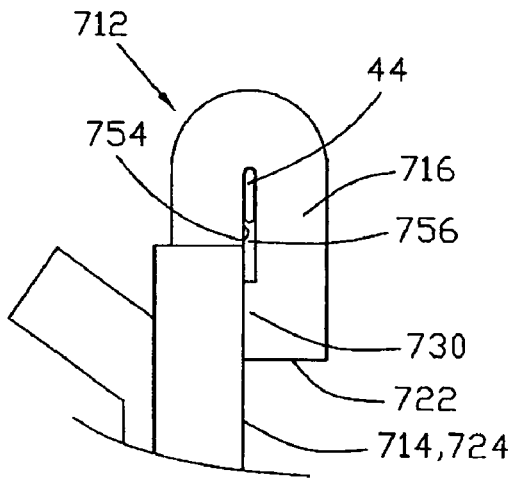

FIG. 11 shows an eighth embodiment of a commutator segment 712. In this embodiment, in order to achieve the required interior gap 756 for the lead wire 44, distal free end portion 722 of foldable tang 716 includes a projecting stop 730 which is formed on the interior surface 754 of the tang 716. The stop 730 projects laterally to the longitudinal extent of the tang 716 so that, when the tang 716 is in a folded condition, the stop 730 abuts the brush-contacting surface 724, whereby the interior surface 754 defines the interior gap 756 for the lead wire 44.

In this eighth embodiment, the stop 730 is on the preformed wire-accommodating portion. With the tang 716 in an unfolded and rectilinear condition, the stop 730 is offset from the brush-contacting surface 724 in the longitudinal direction of the tang 716. Furthermore, with the tang 716 in an unfolded and rectilinear condition, the stop 730 projects above and is thus offset from a plane of the brush-contacting surface 724. The stop 730 can be considered to be a step provided on the interior surface 754 of the tang 716. In this case, the step is spaced or remote from the body portion 714. Although defining a step, the stop 730 can be of any profile, including defining a ramp.

It is feasible that the projecting stop could be provided on the body portion, instead of at the distal end portion of the tang.

Although aluminium or aluminium-plated windings are suggested, other electrically conductive materials, other than copper, can be considered, such as precious metals, for example, silver and gold.

The step or ramp described above can form part of a recess or slot, which can be formed in part or fully within the foldable tang. The recess or slot is dimensioned to receive part of the diameter of the winding lead wire.

The intention of the step or ramp is to provide a preformed wire-accommodating portion on or adjacent to the foldable tang so as to provide a space or interior gap for at least in part receiving a winding lead wire when the tang is folded.

Although a step or ramp is suggested as being suitable for forming the wire-accommodating portion, any suitable profile or formation can be utilised.

The chamfered or rounded longitudinal edge or edges of the foldable tang of the second embodiment can be applied to the foldable tangs of any of the embodiments described.

It is thus possible to provide a commutator with a foldable tang which secures or clamps a winding lead wire without overly deforming it, thus leading to breakage. The scrap rate during manufacture is thus substantially reduced, and winding lead wires formed of more economical, and possibly weaker, material can be utilised. The solder coating on the tang provides protection for the aluminium wire or core by isolating the aluminium from exposure to air and in the case of the aluminium wire to prevent galvanic corrosion between the aluminium of the wire and the copper of the tang.

The embodiments described above are given by way of examples only, and various other modifications will be apparent to persons skilled in the art without departing from the scope of the invention, as defined by the appended claims.

Thus it can be seen that the present invention creates a commutator for an electric motor, especially a small size, mini, fractional or sub-fractional horsepower DC motor, which can be used with soft winding wire, such as aluminium wire or copper clad aluminium wire.

Although solder as been described as preferably plated or coated onto the tang, preferably at least on the surface of the tang which contacts the wire, the solder could be applied by other means, such as placing a piece of solder under the tang during the fusing process.

Also, while solder has been suggested as the material of choice for the providing the protective barrier, other electrically conductive ductile materials may be used, such as tin or nickel plating. Indeed, a relatively soft material may assist in preventing damaging deformation of the lead wire and/or the copper coating of a CCA wire.

In the description and claims of the present specification, each of the verbs "comprise", "include", "contain" and "have", and variations thereof, are used in an inclusive sense, to specify the presence of the stated item but not to exclude the presence of additional items.

The invention claimed is:

1. A commutator for an electric motor, comprising a plurality of commutator segments supported by an electrically non-conductive base, the commutator segments comprising:
    an electrically conductive body portion and at least one tang provided on the body portion for engaging a winding lead wire of the electric motor;
    the tang being electrically conductive and foldable and having a proximal end on or adjacent to the body portion, and a distal end remote from the proximal end; and
    a preformed wire-accommodating portion on or adjacent to the tang, so that, when the tang is folded, the distal end contacts a brush contacting surface of the body portion, and the wire-accommodating portion provides a predetermined interior gap for accommodating the winding lead wire without damaging the lead wire, and a layer of an electrically conductive ductile material formed on a surface of the tang that contacts the winding lead wire;
    wherein the winding lead wire and the tang are made of different material and the electrically conductive ductile material provides a protective layer between the tang and the lead wire to reduce galvanic corrosion.

2. The commutator of claim 1, wherein the electrically conductive ductile material is tin.

3. The commutator of claim 1, wherein the electrically conductive ductile material is solder.

4. The commutator of claim 3, wherein the solder is arranged to flow over and cover a contact portion of the winding lead wire during attachment.

5. The commutator of claim 1, wherein the wire-accommodating portion is one of a step and a ramp.

6. The commutator of claim 5, wherein the said step or ramp is provided on at least one of the tang spaced from the body portion and on the body portion.

7. The commutator of claim 1, wherein the tang is hooked shaped.

8. The commutator of claim 1, wherein, when the tang is folded and contacting the brush-contacting surface, an interior surface of the tang is spaced from the brush-contacting surface and defines the predetermined interior gap.

9. The commutator of claim 1, wherein the tang includes a longitudinal interior edge which extends from the proximal end to the distal end, the longitudinal interior edge including a chamfer or rounded portion.

10. An electric motor comprising a stator, a rotor having a shaft and a rotor core mounted on the shaft, electrically conductive windings wound on the rotor core, the commutator of claim 1, and brush gear in contact with the body portion, with the tang in a folded condition, at least one of the lead wires or the winding passing through the predetermined gap formed by the wire-accommodating portion.

11. The electric motor of claim 10, wherein the winding lead wires include aluminum, and the tang is made of copper.

12. The electric motor of claim 10, wherein the ductile material coats a portion of the lead wire and fills the predetermined internal gap.

13. The commutator of claim 1, wherein the proximal end of the tang is offset in a radial direction from the brush contacting surface of the body portion.

14. The commutator of claim 1, wherein the lead wire includes aluminum and the tang is copper.

* * * * *